United States Patent
Fuller et al.

(10) Patent No.: US 10,933,634 B2
(45) Date of Patent: Mar. 2, 2021

(54) CONDUCTIVE WIRE DISPOSED IN A LAYER

(71) Applicant: HEWLETT-PACKARD DEVELOPMENT COMPANY, L.P., Fort Collins, CO (US)

(72) Inventors: Anthony M Fuller, Corvallis, OR (US); Terry McMahon, Corvallis, OR (US); Donald W Schulte, Corvallis, OR (US); Amy Gault, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/301,132

(22) PCT Filed: Aug. 3, 2016

(86) PCT No.: PCT/US2016/045419
§ 371 (c)(1),
(2) Date: Nov. 13, 2018

(87) PCT Pub. No.: WO2018/026367
PCT Pub. Date: Feb. 8, 2018

(65) Prior Publication Data
US 2019/0210366 A1     Jul. 11, 2019

(51) Int. Cl.
*B41J 2/14*     (2006.01)
*B41J 2/16*     (2006.01)
*G01N 27/20*     (2006.01)

(52) U.S. Cl.
CPC ....... *B41J 2/14072* (2013.01); *B41J 2/14153* (2013.01); *B41J 2/1601* (2013.01); *B41J 2/1629* (2013.01); *B41J 2/1634* (2013.01); *G01N 27/20* (2013.01)

(58) Field of Classification Search
CPC .. B41J 2/14072; B41J 2/14153; B41J 2/1601; B41J 2/1634; B41J 2/1629; G01N 27/20
See application file for complete search history.

(56) References Cited

U.S. PATENT DOCUMENTS

| | | | |
|---|---|---|---|
| 5,942,900 | A | 8/1999 | DeMeerleer et al. |
| 6,033,544 | A | 3/2000 | Demers et al. |
| 6,186,191 | B1 | 2/2001 | Dornier et al. |
| 6,378,978 | B1 | 4/2002 | Chang et al. |
| 6,649,986 | B1 | 11/2003 | Ishizaki et al. |
| 7,397,103 | B2 | 7/2008 | Archer et al. |

(Continued)

FOREIGN PATENT DOCUMENTS

| | | |
|---|---|---|
| CN | 1522461 | 8/2004 |
| CN | 100372060 | 2/2008 |

(Continued)

*Primary Examiner* — Geoffrey S Mruk
(74) *Attorney, Agent, or Firm* — Law Offices of Michael Dryja

(57) ABSTRACT

A conductive wire disposed in a layer is described. An example apparatus includes a die including a silicon layer and a first layer coupled to the silicon layer. The example apparatus a conductive wire disposed in the first layer adjacent a perimeter of a location at which a fluid feed slot is to be formed in the silicon layer. The conductive wire has an electrical characteristic that corresponds to whether the fluid feed slot is defective.

18 Claims, 11 Drawing Sheets

(56) References Cited

U.S. PATENT DOCUMENTS

| | | |
|---|---|---|
| 7,938,512 B2 | 5/2011 | Yeo et al. |
| 8,575,723 B2 | 11/2013 | Tschmelitsch et al. |
| 8,888,226 B1 | 11/2014 | Gardner et al. |
| 8,960,848 B2 | 2/2015 | Yokouchi |
| 2013/0070012 A1* | 3/2013 | Yokouchi ............ B41J 2/14153 347/14 |
| 2015/0085020 A1 | 3/2015 | Sakurai et al. |
| 2016/0031216 A1 | 2/2016 | Friesen et al. |
| 2016/0144631 A1 | 5/2016 | Takagi |

FOREIGN PATENT DOCUMENTS

| | | |
|---|---|---|
| CN | 102445649 | 5/2012 |
| CN | 103185736 | 7/2013 |
| CN | 103596764 | 2/2014 |
| JP | S55022106 A | 2/1980 |
| WO | WO-2001084102 A1 | 11/2001 |
| WO | WO-2015028213 A1 | 3/2015 |

* cited by examiner

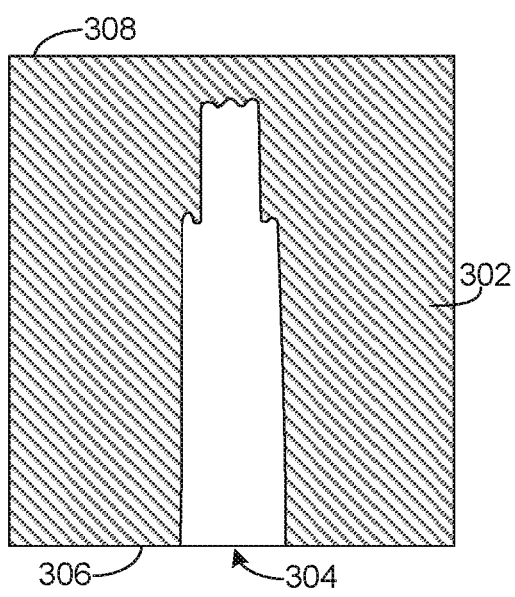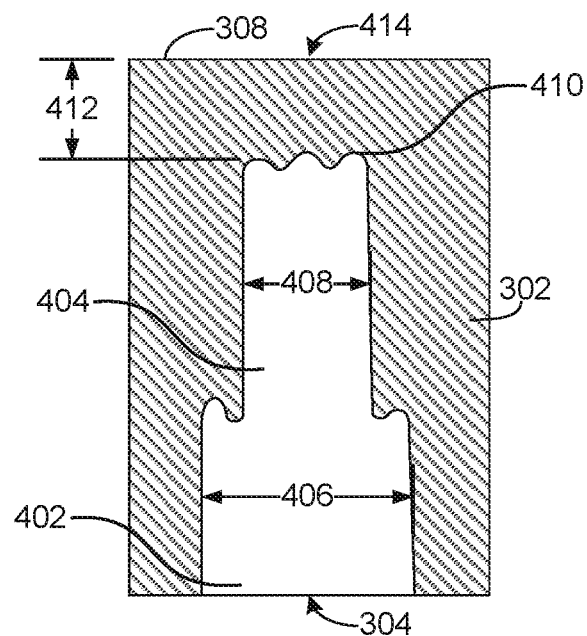
FIG. 3
FIG. 4
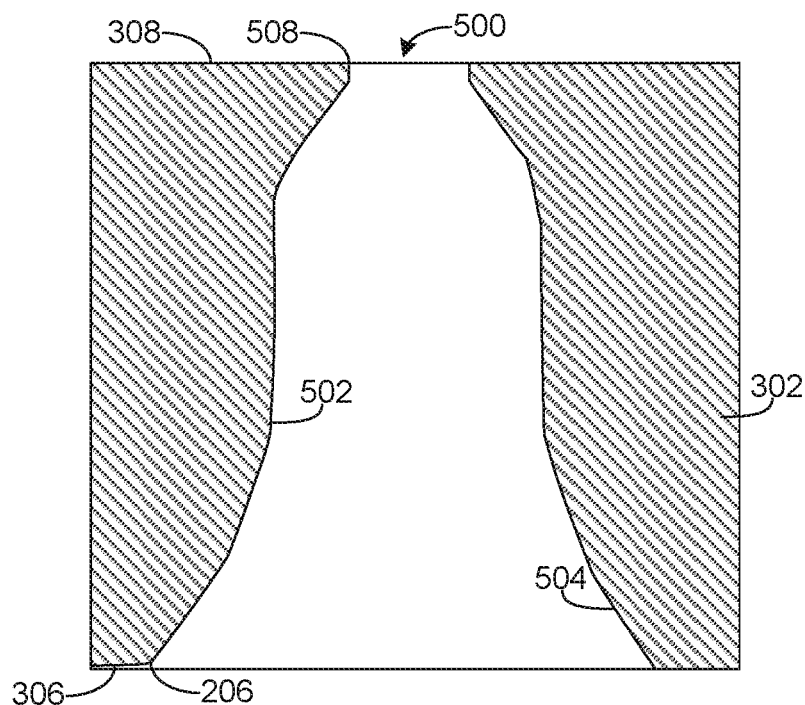
FIG. 5 ns in accordance with the teachings disclosed herein.
CONDUCTIVE WIRE DISPOSED IN A LAYER

BACKGROUND

Fluid ejection devices (e.g., ink jet printing devices) are utilized to apply printing material (e.g., ink) onto a printing surface (e.g., paper). Fluid ejection devices oftentimes include fluid feed slots (e.g., ink jet slots) formed in fluid ejection die(s) through which the printing material is emitted onto the printing surface. In some instances, fluid feed slots are formed in a silicon layer of the fluid ejection die via a laser machining process and a subsequent wet-etching process.

BRIEF DESCRIPTION OF THE DRAWINGS

FIG. 3 is a cross-sectional view taken along line A-A of FIG. 1 of an example trench formed via a laser machining process that is utilized to form a fluid feed slot in accordance with the teachings disclosed herein.

FIG. 4 is an enlarged cross-sectional view of the trench of FIG. 3.

FIG. 5 is a cross-sectional view taken along line A-A of FIG. 1 of an example fluid feed slot formed from the trench of FIGS. 3-4 via a wet-etching process in accordance with the teachings disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
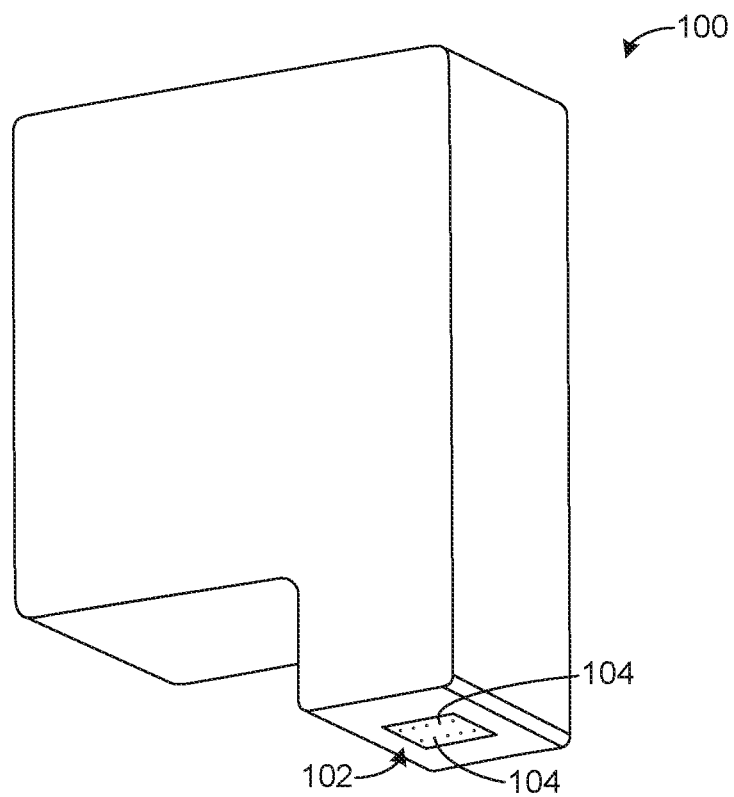
FIG. 1 is a perspective view of an example fluid ejection device in accordance with the teachings disclosed herein.

Recently, fluid ejection devices (e.g., printing systems, printing devices, cartridges, printheads, print bars, etc.) have been utilized to apply printing material (e.g., ink, toner, fluids, powders, colorants, varnishes, finishes, gloss enhancers, binders, etc.) onto a printing surface. Some fluid ejection devices include fluid ejection die(s) that apply the printing material onto the printing surface. For example, a printing device, such as an ink jet printer, may include a printhead having a plurality of fluid ejection dies, each of which applies printing material onto the printing surface. Such fluid ejection dies include fluid feed slots through which the printing material is emitted.

Fluid feed slots may be formed in a silicon layer or wafer of a fluid ejection die. In some examples, the fluid feed slots are formed via a laser machining process and a subsequent wet-etching process. For example, during the laser machining process, a portion of the silicon layer is etched out of the silicon layer of the fluid ejection die to form a trench where a fluid fed slot is intended to be located. The wet-etch process refines the trench formed by the laser machining process to precisely define contours of the fluid feed slot that emit printing material in a quick and consistent manner. In some instances, the laser machining process etches too much material of the silicon layer, thereby resulting in damage to the silicon layer and/or a defect in the fluid feed slot to be formed. For example, if a surface of the silicon layer beyond the intended perimeter of the fluid feed slot is breached during the laser machining process (a phenomenon sometimes referred to as "laser punch-through"), the wet-etching process may subsequently damage an edge of the feed slot which may render the ink slot unsuitable for its intended purpose of emitting printing material.

While current approaches are available to detect defects resulting from the laser machining process, such approaches are unable to detect consistently defects with the fluid feed slot before the corresponding printing device is completely and/or substantially assembled.

In some instances, automated visual inspection (AVI) tooling is utilized to inspect for physical damage to and/or defects of the fluid ejection die. However, AVI tooling may not consistently detect defects of the fluid feed slots. As a result, a fluid ejection device may be fully or near fully manufactured before the damaged and/or defective fluid ejection die is detected, thereby resulting in costly waste. In other instances, an n-well pattern is formed in a silicon layer (e.g., via doping of silicon) of a fluid ejection die to detect defects formed during fabrication of fluid feed slots in the fluid ejection die. For example, the n-well patterns are utilized to detect if a fluid feed slot is formed to be larger than its intended size (e.g., as a result of a phenomenon known as "blow-out" in which more silicon material is removed than intended from the silicon layer during a wet-etching process of a fabrication process of the fluid feed slot). However, while n-well patterns formed in silicon layers have been utilized to detect defects formed in the silicon layer by the wet-etching process (e.g., blow-out of the silicon layer), such patterns are typically unable to detect defects formed along edges of other layers of the fluid ejection die (e.g., a field oxide layer, a dielectric layer, a passivation layer, etc.) that are coupled to the silicon layer and adjacent the fluid feed slots. For example, the field oxide layer, the dielectric layer, the passivation layer and/or other layers of the fluid ejection die that are coupled to the silicon layer typically are damaged if a laser machining process of the fabrication process punches through the silicon layer and/or etches into those other layers to enable a solvent of the wet-etching process to react with and/or otherwise damage those other layers. The n-well patterns are typically positioned too far from the edges of those layers (e.g., approximately 11 micrometers from the edges) to consistently detect the defects formed along the edges of those layers adjacent the fluid feed slots. Further, moving the n-well patterns closer to the edges of the fluid feed slot to enable the n-well patterns to detect defects in the adjacent layers of the fluid ejection die results in the n-well patterns identifying defects formed in the silicon that are, in fact, not present (e.g., the n-well pattern identifies false positives). For example, to enable the n-well patterns to detect the defects formed in the field oxide layer, the dielectric layer and/or the passivation layer of the fluid ejection die, the n-well patterns are positioned at a location in the silicon layer that is properly etched from the silicon layer when forming the fluid feed slots.

Examples disclosed herein position a conductive wire (e.g., a poly-silicon wire, an aluminum copper wire) that is reactive to liquid solvent of a wet-etching process along an edge of layers (e.g., a field oxide layer, a dielectric layer, a passivation layer, etc.) coupled to a silicon layer (e.g., a silicon wafer) of a fluid ejection die and adjacent a perimeter of an intended location of a fluid feed slot to be formed in the silicon layer to enable early detection of and/or defects formed along the edge during fabrication of the fluid ejection die of a fluid ejection device (e.g., printing systems, printing devices, cartridges, printheads, print bars, etc.). That is, by positioning the conductive wire within the other layers of the fluid ejection die that are coupled to the silicon layer, the conductive wire may be positioned closer to the edge of those layers to consistently detect any defects formed along the edge of those layers. For example, the conductive wire is positioned tightly adjacent (approximately between 4 micrometers and 8 micrometers from) the edge of the layers in which the conductive wire is disposed and/or the adjacent intended perimeter of the fluid feed slot. As a result, damage to the edge caused by a laser machining process of a fabrication process of the fluid ejection die will likewise affect (e.g., damage) the conductive wire. The damage to the conductive wire can be detected, for example, by applying a voltage to the conductive wire and measuring a corresponding resistance. For example, an open circuit condition will be detected if the conductive wire is broken by the damage caused to the conductive wire. Thus, damage to the edge of the fluid feed slot is detected by checking an electrical condition of the conductive wire. This review of the electrical condition of the conductive wire can be performed soon after the fluid feed slot is formed, thereby enabling defective fluid ejection dies to be identified and discarded before additional time and expense are expended on further manufacturing efforts. For example, the defects can be detected before a printhead and/or print bar is completely assembled, thereby reducing manufacturing costs by enabling early termination of the fabrication process if a defective fluid feed slot is present. Therefore, the examples disclosed herein enable early detection of defects in ink feed slots.

Disclosed example apparatus include a die including a silicon layer and a first layer coupled to the silicon layer. The example apparatus include a conductive wire disposed in the first layer adjacent a perimeter of a location at which a fluid feed slot is to be formed in the silicon layer. The conductive wire has an electrical characteristic that corresponds to whether the fluid feed slot is defective. In some examples, the conductive wire is positioned in the first layer to enable an electrical resistance of the conductive wire to increase when an edge of the first layer adjacent the fluid feed slot is defective. In some examples, the electrical characteristic of the conductive wire is an electrical resistance that may correspond to whether the fluid feed slot is defective. The electrical resistance may indicate that the die is defective when the electrical resistance is greater than a predetermined value. In some examples, the first layer includes a field oxide layer, a dielectric layer, and a metallic layer. The field oxide layer is to isolate the silicon layer from the metallic layer and the conductive wire. The dielectric layer is to provide insulation between the metallic layer and the conductive wire. In some such examples, the conductive wire is positioned between the location at which a fluid feed slot is to be formed and the metallic layer such that the electrical characteristic of the conductive wire is to correspond to whether the metallic layer is damaged. In some examples, the conductive wire is spaced apart from an edge of the first layer adjacent the location at which the fluid feed slot is to be formed by approximately between 4 micrometers and 8 micrometers such that detection of whether the fluid feed slot is defective may be detected with the conductive wire. In some examples, the electrical characteristic of the conductive wire corresponds to a defect formed by at least one of a laser machining process and a wet-etching process during fabrication of the fluid feed slot. In some examples, the conductive wire extends around a plurality of locations at which a plurality of fluid feed slots are to be formed in the die such that the electrical characteristic of the conductive wire corresponds to whether at least one of the plurality of fluid feed slots is defective.

Other disclosed example apparatus include a fluid ejection die including a silicon wafer and a first layer. The example apparatus include a conductive wire disposed in the first layer adjacent a location at which a fluid feed slot is to be formed in the silicon wafer. The conductive wire has an electrical resistance that corresponds to whether a defect is formed during fabrication of the fluid feed slot. In some examples, the conductive wire is composed of material that is reactive to a liquid solvent of a wet-etching process. In some such examples, the conductive wire is composed of poly-silicon or aluminum copper.

Disclosed example methods include positioning a conductive wire in a first layer of a die adjacent a perimeter of an intended location of a fluid feed slot and forming the fluid feed slot in a silicon layer at the intended location. The first layer is coupled to the silicon layer. The conductive wire is positioned such that an electrical characteristic of the conductive wire corresponds to whether a defect is formed in the fluid feed slot. Some example methods include determining whether the fluid feed slot is defective by comparing the electrical characteristic of the conductive wire to a predetermined resistance value. The electrical characteristic is an electrical resistance. The electrical resistance indicates the fluid feed slot is defective if the electrical resistance is greater than the predetermined resistance value. Some such example methods include measuring the electrical resistance of the conductive wire after the fluid feed slot is fabricated. The electrical resistance corresponds to whether at least one of a laser manufacturing process and a wet-etching process damaged an edge of the first layer adjacent the fluid feed slot during fabrication of the fluid feed slot. Some such example methods include measuring the electrical resistance of the conductive wire after a laser machining process and before a wet-etching process during fabrication of the fluid feed slot. The electrical resistance corresponds to whether the laser manufacturing process damaged an edge of the first layer adjacent the fluid feed slot during fabrication of the fluid feed slot.

FIG. 1 is a perspective view of an example fluid ejection device 100 in accordance with the teachings disclosed herein. In the illustrated example, the fluid ejection device 100 is a fluid ejection cartridge that includes a fluid ejection die 102 in which fluid ejection nozzles, two of which are noted with reference number 104, are formed. Printing material (e.g., ink, toner, fluids, powders, colorants, varnishes, finishes, gloss enhancers, binders, and/or other such materials that may be utilized in a printing process) is provided to the fluid ejection nozzles from a fluid feed slot (e.g., a fluid feed slot 500 of FIG. 5, a fluid feed slot 606 of FIGS. 6-7, fluid feed slots 802 of FIGS. 8-9, fluid feed slots 804 of FIG. 8) and is emitted through the fluid ejection nozzles 104 onto a printing surface.

Figure 2:
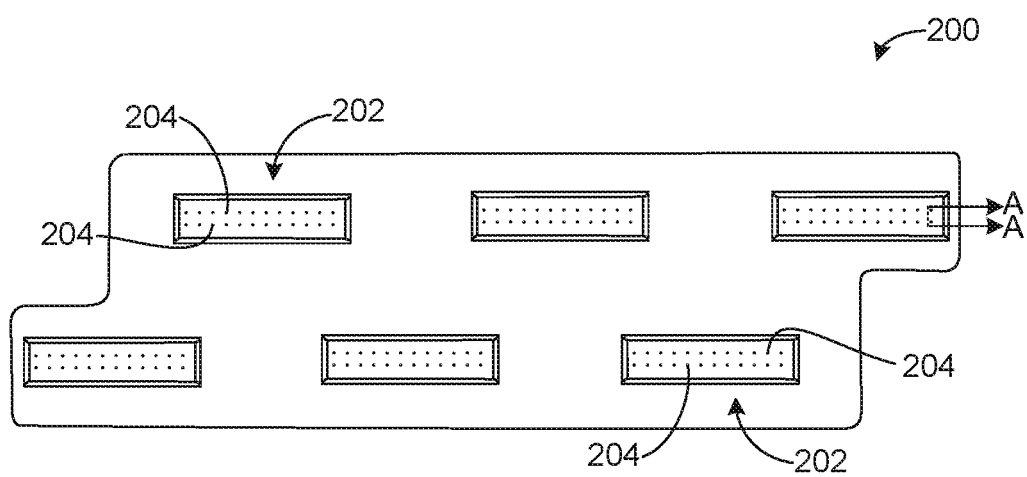
FIG. 2 is a top-view of another example fluid ejection device in accordance with the teachings disclosed herein.

FIG. 2 depicts another example fluid ejection device 200 in accordance with the teachings disclosed herein. In the illustrated example, the fluid ejection device 200 is a printhead that includes a plurality of fluid ejection dies, two of which are noted with reference number 202. For example, each of the fluid ejection dies 202 includes a plurality of fluid ejection nozzles, four of which are note with reference number 204, through which printing material is received from a fluid feed slot (e.g., the fluid feed slot 500 of FIG. 5, the fluid feed slot 606 of FIGS. 6-7, the fluid feed slots 802 of FIGS. 8-9, the fluid feed slots 804 of FIG. 8) and is emitted onto a printing surface. In some examples, the printhead of FIG. 2 is combined with other printhead(s) to form a print bar of a printing device. Additionally or alternatively, the fluid ejection dies 202 of the example fluid ejection die 202 may be in fluid communication with and/or receives printing material from printing material cartridge(s).

The fluid ejection die 102 of FIG. 1 and the fluid ejection dies 202 are example fluid ejection dies formed in accordance with the teachings of this disclosure. The example fluid ejection dies may be incorporated into and/or utilized by any fluid ejection devices such as printing systems, printing devices, print bars, printheads, cartridges and/or any other such devices from which printing material is emitted onto printing surfaces.

FIGS. 3-5 depict formation of a fluid feed slot 500 (FIG. 5) in an example silicon wafer or layer 302 of a fluid ejection die (e.g., the fluid ejection die 202 of FIG. 2) in accordance with the teachings herein. While formation of a fluid feed slot in the silicon wafer 302 is discussed below with respect to the fluid ejection die 202, the teachings disclosed herein may be utilized to form fluid feed slots in other fluid ejection dies (e.g., the fluid ejection die 102 of FIG. 1). Returning to FIGS. 3-5, the fluid feed slot 500 is formed in the silicon wafer 302, for example, via a laser machining process and a wet-etching process. For example, the laser machining process is initially utilized to form a trench 304, and the wet-etching process is subsequently utilized to refine the trench 304 to precisely define contours and edges of the fluid feed slot 500. FIG. 3 depicts a cross-sectional view taken along line A-A of FIG. 1 of an example trench 304 that is formed in the silicon wafer 302 via the laser machining process, FIG. 4 depicts an enlarged cross-sectional view of the trench 304, and FIG. 5 depicts a cross-sectional view taken along line A-A of FIG. 1 of the fluid feed slot 500 that is formed from the trench 304 via the wet-etching process.

As illustrated in FIG. 3, the trench 304 is initially formed in the silicon wafer 302 via the laser machining process. Laser machining (e.g., laser beam machining) is a subtractive manufacturing process in which a laser is directed toward a surface to remove material from the surface via thermal energy. For example, the laser machining process is utilized to remove a bulk, majority and/or otherwise substantial portion of the silicon wafer 302 that is to be. In the illustrated example, the laser machining process is utilized to remove material (e.g., silicon) along a first side 306 of the silicon wafer 302. For example, the trench 304 extends from the first side 306 of the silicon wafer 302 toward an opposing second side 308 of the silicon wafer 302. In some examples, when the fluid feed slot 500 is formed and the corresponding fluid ejection die 202 is assembled, the fluid ejection nozzles 204 (FIG. 2) are positioned adjacent the fluid feed slot 500 along the second side 308 of the silicon wafer 302 to enable the fluid feed slot 500 to provide printing material to the fluid ejection nozzles 204 that emit the printing material onto a printing surface.

As illustrated in FIG. 4, the trench 304 formed via the laser machining process includes a first portion 402 and a second portion 404 adjacent the first portion 402. The first portion 402 is adjacent the first side 306 (FIG. 3) of the trench 304 and has a width 406 (e.g., a first width), and the second portion 404 is closer to the second side 308 of the trench 304 and has a width 408 (e.g., a second width) that is less than the width 406. For example, the width 406 of the first portion 402 is approximately 140 micrometers, and the width 408 of the second portion 404 is approximately 84 micrometers.

Further, in the illustrated example, the example trench 304 formed by the laser machining process does not extend through the silicon wafer 302 to the second side 308 of the silicon wafer 302. Instead, as illustrated in FIG. 4, an end 410 of the trench 304 is spaced apart from the second side 308 by a distance 412 (e.g., of approximately 65 micrometers). That is, in the illustrated example, a phenomenon sometimes referred to as "laser punch-through" is avoided in which the laser machining process causes the trench 304 to extend to (and punch or break through) the second side 308 of the silicon wafer 302. For example, laser punch-through resulting from the laser machining process damages and/or undesirably removes a portion 414 of the silicon wafer 302 between the targeted end 410 of the trench 304 and the second side 308 of the silicon wafer 302. Laser punch-through is undesirable when forming the fluid feed slot 500 because, while the laser machining process quickly removes a substantial amount of material from the silicon wafer 302, the laser machining process etches material from the silicon wafer 302 less precisely than the wet-etching process. Because the contours, angles, edges and/or other dimensions of the fluid feed slot 500 affect how printing material is provided to the fluid ejection nozzles 204 that emit the printing material onto the printing surface, the wet-etching process is utilized to refine the trench 304 to define an edge (e.g., an edge 508 of FIG. 5) of the fluid feed slot 500 along the second side 308 of the silicon wafer 302. Thus, to prevent the laser machining process from negatively affecting the edge 508 of the fluid feed slot 500, the trench 302 is not to extend to the second side 308 of the silicon wafer 302.

FIG. 5 illustrates the fluid feed slot 500 that is formed from the trench 304 (FIGS. 3-4) via the wet-etching process. Wet etching is a subtractive manufacturing process in which liquid solvents are utilized to dissolve silicon left exposed by a mask. In some examples, wet etching enables precise lengths, angles, contours and/or other dimensions to be formed in a silicon layer (e.g., the silicon wafer 302). In some examples, tetramethylammonium (TMAH) hydroxide is utilized in the wet-etching process (e.g., a TMAH Si wet-etching process) to dissolve silicon of the silicon wafer 302 along the trench 304 to form the fluid feed slot 500. For example, to enable the fluid feed slot 500 to consistently provide printing material to the fluid ejection nozzles 204 that emit the printing material onto a printing surface, the wet-etching process precisely defines a contour 502 of a body 504 of the fluid feed slot 500, an edge 506 along the first side 306 of the silicon wafer 302, and an edge 508 along the opposing second side 308 of the silicon wafer 302.

Figure 6:
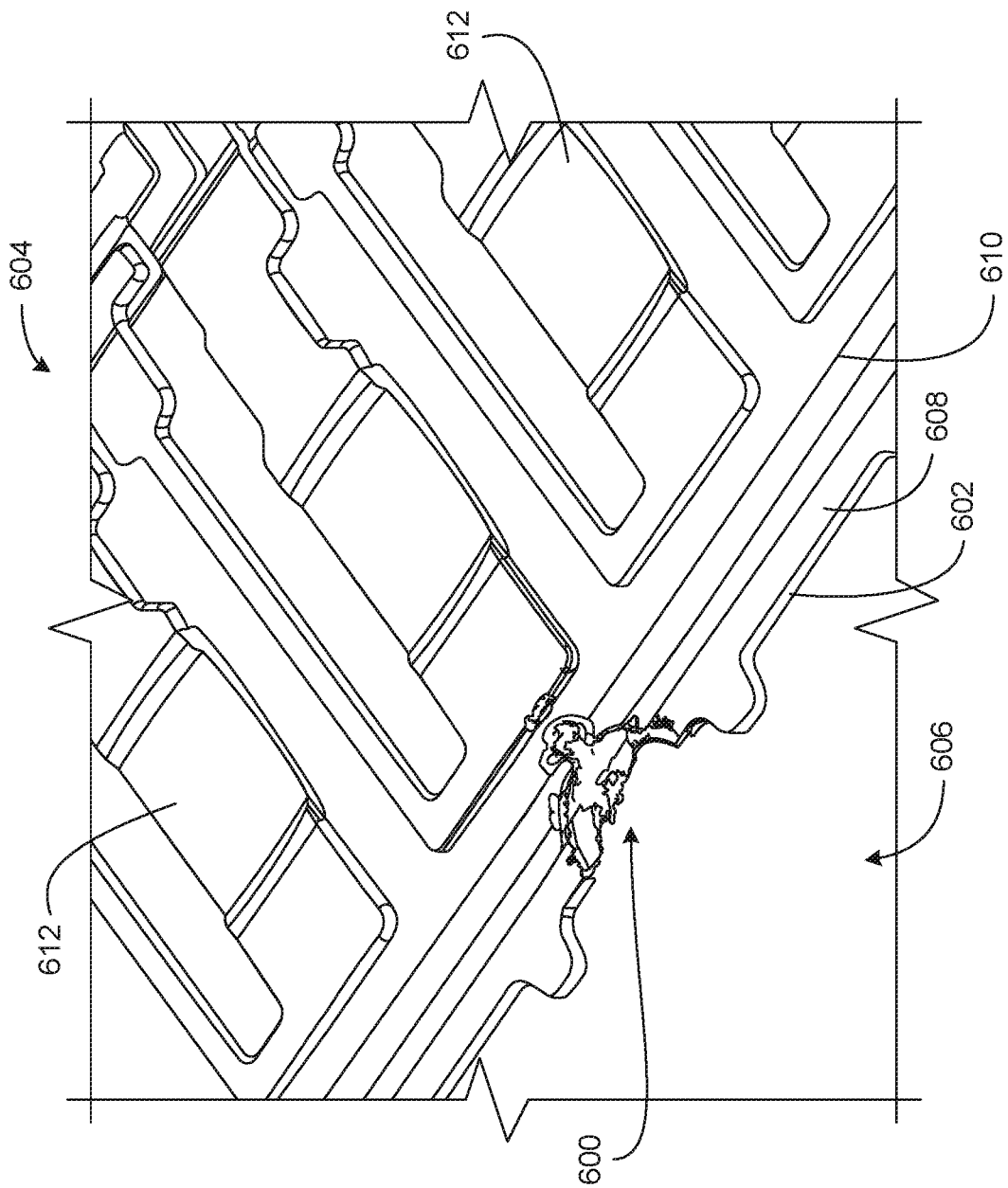
FIG. 6 is an enlarged, perspective view of an example defect formed along an edge defining a fluid feed slot.

FIG. 6 is an enlarged, perspective view of a defect 600 formed along an edge 602 of the fluid ejection die 604 defining a fluid feed slot 606 (e.g., along the edge 508 of the fluid feed slot 500 of FIG. 5) during fabrication of the fluid feed slot 606. The example fluid ejection die 604 includes an example first film layer 608, an example second film layer 610, example resistors 612, and a silicon wafer (e.g., the silicon wafer 302 of FIGS. 3-5). In FIG. 6, the silicon wafer in which the fluid feed slot 606 is formed is positioned beneath the first film layer 608. The resistors 612 initiate and/or control emission of printing material through the fluid feed slot 606.

The defect 600 of the illustrated example is caused by laser punch-through in which the laser machining process causes a trench (e.g., the trench 304 of FIGS. 3-4) to extend through and breach a surface of the silicon wafer that is adjacent the edge 602. For example, because the silicon wafer defining the fluid feed slot 606 is adjacent the edge 602, the laser punch-through also damages the edge 602 when the laser machining process breaks through the silicon wafer. In some examples, a laser of the laser machining process directly causes the defect 600 of the fluid ejection die 604 by removing material from the first film layer 608, the second film layer 610, and/or the resistors 612. Additionally or alternatively, the laser machining process may cause the defect of the fluid ejection die 604 by removing a portion of the silicon wafer that enables a solvent of the wet-etching process to contact and, thus, cause the edge 602 of the fluid ejection die 604 to deteriorate.

Figure 7:
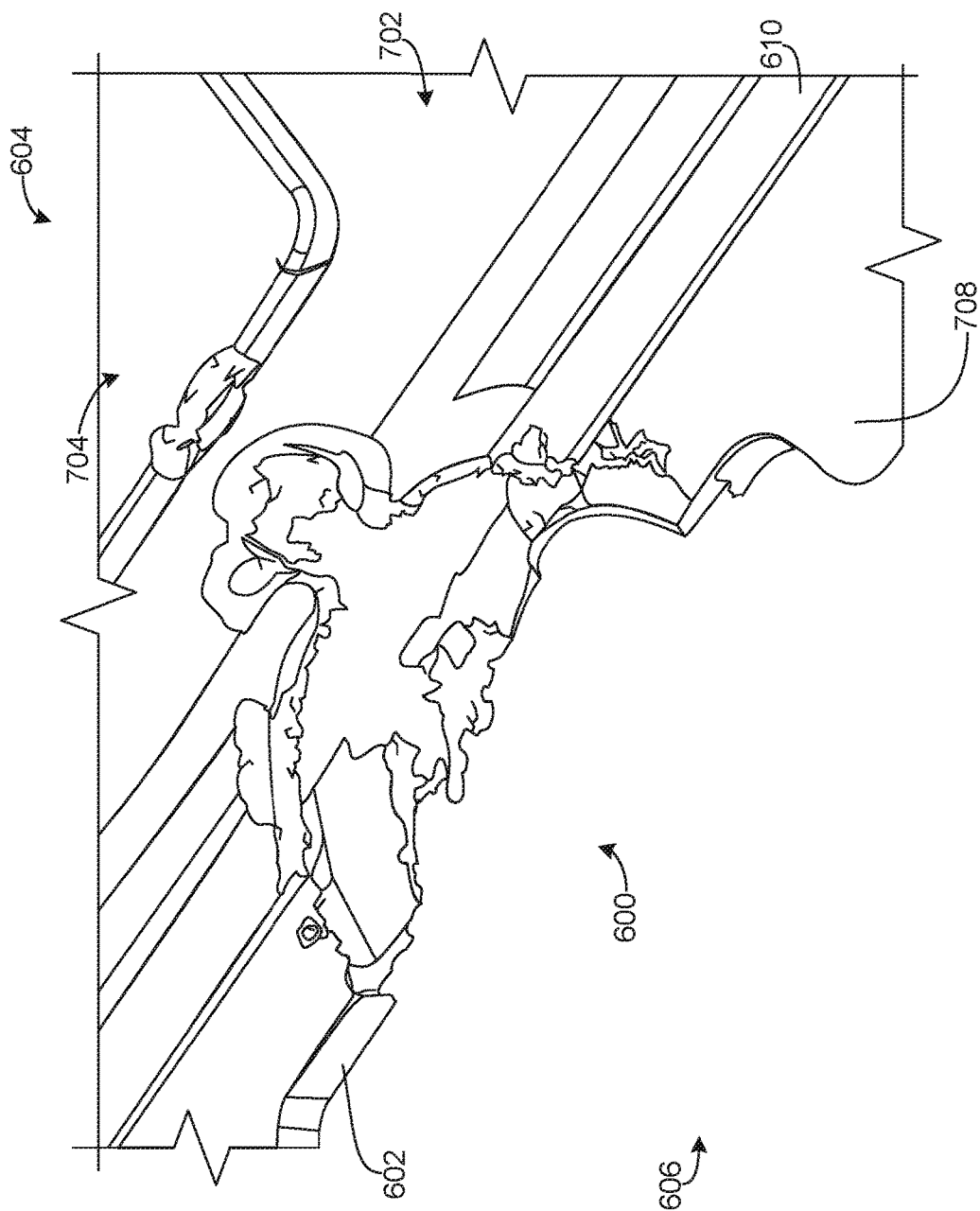
FIG. 7 is a further enlarged view of the defective edge of FIG. 6.

FIG. 7 is a further enlarged view of the defect 600 formed along the edge 602 of fluid ejection die 604 during fabrication of the fluid feed slot 606. As illustrated in FIG. 7, the defect 600 includes damage to portions of the first film layer 608 and the second film layer 610 along the edge 602 of the fluid ejection die 604. Further, the defect 600 includes damage to layers of the fluid ejection die 604 disposed between the first film layer 608 and the second film layer 610. For example, the defect 600 damages and/or otherwise affects a first metallic layer 702 and a second metallic layer 704 that are covered by the second film layer 610. Such damage may prevent the fluid feed slot 606 from consistently and/or precisely providing printing material to adjacent fluid ejection nozzles (e.g., the fluid ejection nozzles 104 of FIG. 1, the fluid ejection nozzles 204 of FIG. 2) that emit the printing material onto a printing surface.

While there are currently some approaches to detect defects resulting from the laser machining process, such approaches are unable to consistently detect defects with the fluid feed through before the corresponding printing device is completely and/or substantially assembled. For example, automated visual inspection (AVI) tooling oftentimes fails to detect the defect 600 before an entire printing device is fully or nearly fully assembled, thereby resulting in costly waste. Further, n-well patterns that detect defects of the silicon wafer (e.g., "blow out" of the silicon wafer) are positioned too far (e.g., approximately 11 micrometers) away from the edge 602 of the fluid feed slot 606 to consistently detect the defect 600 formed in the first film layer 608, the second film layer 610 and/or the resistors 612. Moreover, positioning the n-well patterns closed to the edge 602 results in the n-well patterns improperly identifying non-existent defects in the silicon layer (e.g., false positives).

Figure 8:
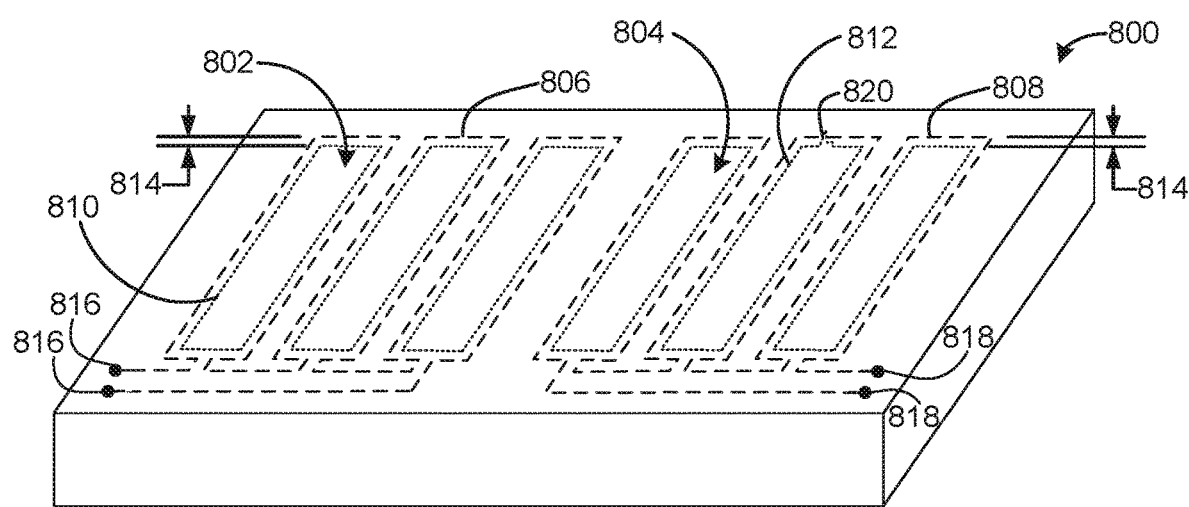
FIG. 8 is a diagram of a fluid ejection die including example conductive wires to detect a defect of fluid feed slots in accordance with the teachings herein.

FIG. 8 is a schematic of an example fluid ejection die 800 in which example fluid feed slots 802 and example fluid feed slots 804 are to be formed in accordance with the teachings herein. In the illustrated example, an example conductive wire 806 is positioned in a layer (e.g., a first layer 904 of FIGS. 9-10) coupled to a silicon wafer (e.g., a silicon wafer 902 of FIGS. 9-11) of the fluid feed slots 802, 804 adjacent the fluid feed slots 802 enable and/or facilitate consistent detection of detect whether a defect (e.g., the defect 600 of FIGS. 6-7) is formed in that layer along the edge of one of the fluid feed slots 802 by a laser machining process and/or wet-etching process. Further, an example conductive wire 808 is positioned adjacent the fluid feed slots 804 to enable and/or facilitate consistent detection of whether a defect (e.g., the defect 600 of FIGS. 6-7) is formed along one of the fluid feed slots 804. As illustrated in FIG. 8, the conductive wire 806 extends around locations of perimeters 810 of the respective fluid feed slots 802 to be formed, and the conductive wire 808 extends around locations of perimeters 812 of the respective fluid feed slots 804 to be formed. For example the conductive wires 806, 808 partially and/or substantially enclose the locations at which the perimeters 810, 812 of the corresponding fluid feed slots 802, 804 are to be formed in the fluid ejection die 800. The conductive wires 806, 808 are adjacent the intended locations of the perimeters 810, 812 of each of the corresponding fluid feed slots 802, 804 to enable electrical characteristics (e.g., electrical resistances) of the conductive wires 806, 808 to correspond to whether any one of the corresponding fluid feed slots 802, 804 is defective as a result of, for example, a laser machining process and/or a wet etching process during fabrication of the fluid feed slots 802, 804. For example, the conductive wires 806, 808 are close enough to the perimeters 810, 812 of the corresponding fluid feed slots 802, 804 so that the conductive wires 806, 808 are damaged and/or otherwise compromised when a defect is formed in one of the corresponding fluid feed slots 802, 804. For example, the conductive wires 806, 808 are spaced apart from the locations of the perimeters 810, 812 at which the corresponding fluid feed slots 802, 804 are to be formed by a distance 814 of approximately 4 micrometers and 8 micrometers to enable the electrical characteristics of the conductive wires 806, 808 to correspond to whether a defect is formed along an edge (e.g., the edge 602 of FIGS. 6-7) of one of the corresponding fluid feed slots 802, 804.

The conductive wires 806, 808 are composed of, for example, poly-silicon, aluminum copper and/or any other conductive material that is reactive and/or susceptible to liquid solvent (e.g., TMAH) of the wet-etching process. Further, the example conductive wires 806, 808 have an electrical resistance and are electrically and/or communicatively coupled to an electrical circuit of the fluid ejection die 800. In some examples, the electrical circuit that is electrically coupled to the conductive wires 806, 808 is also coupled to a crack-detect circuit that detects whether a crack has formed in a body of the fluid ejection die. Additionally or alternatively, the electrical circuit that is electrically coupled to the conductive wires 806, 808 is also coupled to an n-well pattern enables and/or facilitates detection of defects formed in a silicon layer (e.g., the silicon wafer 302 of FIGS. 3-5) of the fluid ejection die 800.

The examples disclosed herein utilize the electrical circuit and the electrical resistance of the conductive wires 806, 808 to determine whether any of the corresponding fluid feed slots 802, 804 are defective. The electrical circuit applies a predetermined voltage to the conductive wires 806, 808 and measures corresponding resistances of the conductive wire

806, 808. For example, the resistance of the conductive wire 806 is measured between terminals 816, and the resistance of the conductive wire 808 is measured between terminals 818. If the conductive wire 806 and/or the conductive wire 808 becomes damaged, the electrical resistance of the conductive wire 806 and/or the conductive wire changes. For example, a predetermined voltage is applied to the conductive wires 806, 808 when the conductive wires 806, 808 are known to be undamaged to determine corresponding predetermined electrical resistances associated with the undamaged conductive wires 806, 808.

In the illustrated example, no defect is formed in the fluid feed slots 810. As a result, the resistance of the conductive wire 806 equals and/or is substantially equal to the predetermined electrical resistance associated with the conductive wire 806 and, thus, no defect is detected for the fluid feed slots 810.

As illustrated in FIG. 8, a defect 820 is formed in one of the fluid feed slots 804 that damages and/or creates an open circuit along the conductive wire 808, thereby affecting (e.g., increasing) the electrical resistance of the conductive wire 808. For example, the defect 820 that damages the conductive wire 808 may be formed by the laser manufacturing process during fabrication of the fluid feed slots 804. Additionally or alternatively, because the conductive wire 808 is composed of material (e.g., poly-silicon, aluminum copper) susceptible to the solvent (e.g., TMAH) of the wet-etching process, the conductive wire 808 may be damaged by the solvent of the wet-etching process that is able to contact the conductive wire 808 as a result of damage to the fluid ejection die 800 caused during the laser manufacturing process. Thus, because the conductive wire 808 is adjacent edges of the fluid feed slots 804, the defect 820 of one of the fluid feed slots 804 that is formed during the fabrication process is detected by applying the predetermined voltage to the conductive wire 808 and measuring for a change (e.g., an increase) in the electrical resistance of the conductive wire 808 relative to the predetermined resistance value of the conductive wire 808. For example, the defect 820 formed along an edge of one of the fluid feed slots 804 is identified, because the measured electrical resistance of the conductive wire 808 is greater than the predetermined electrical resistance.

Further, the example conductive wires 806, 808 enable the corresponding fluid feed slots 802, 804 formed in the fluid ejection die 800 to be tested before a fluid ejection device is fully or near fully assembled, thereby reducing costly waste resulting from defective fluid ejection dies (e.g., the fluid ejection die 800). For example, the conductive wires 806, 808 enable defects of the fluid feed slots 802, 804 to be identified before the fluid ejection die 800 is assembled into a corresponding fluid ejection device. Additionally or alternatively, the conductive wire 806, 808 enable defects formed by the laser machining process to be identified before the wet-etching process is executed.

In the illustrated example, each of the conductive wires 806, 808 extend around the three corresponding fluid feed slots 802, 804 of the fluid ejection die 800. For example, the conductive wire 806 (e.g., a first conductive wire) is positioned adjacent the fluid feed slots 802 (e.g., a first set of fluid feed slots) to enable a defect of the first set to be detected, and the conductive wire 804 (e.g., a second conductive wire) is positioned adjacent the fluid feed slots 804 (e.g., a second set of fluid feed slots) to enable a defect of the second set to be detected. Thus, the two conductive wires 806, 808 are utilized to detect a defect in the fluid ejection die 800. In other examples, more (e.g., 1) or less (e.g., 2, 3, 4, etc.) may extend around more (e.g., 4, 5, 6, etc.) or less (e.g., 1, 2) corresponding fluid feed slots of a fluid ejection die. For example, one conductive wire (e.g., the conductive wire 806 or the conductive wire 808) may extend around each of the fluid feed slots of a fluid ejection die to enable detection of a defect of any of the fluid feed slots of the fluid ejection die.

Figure 9:
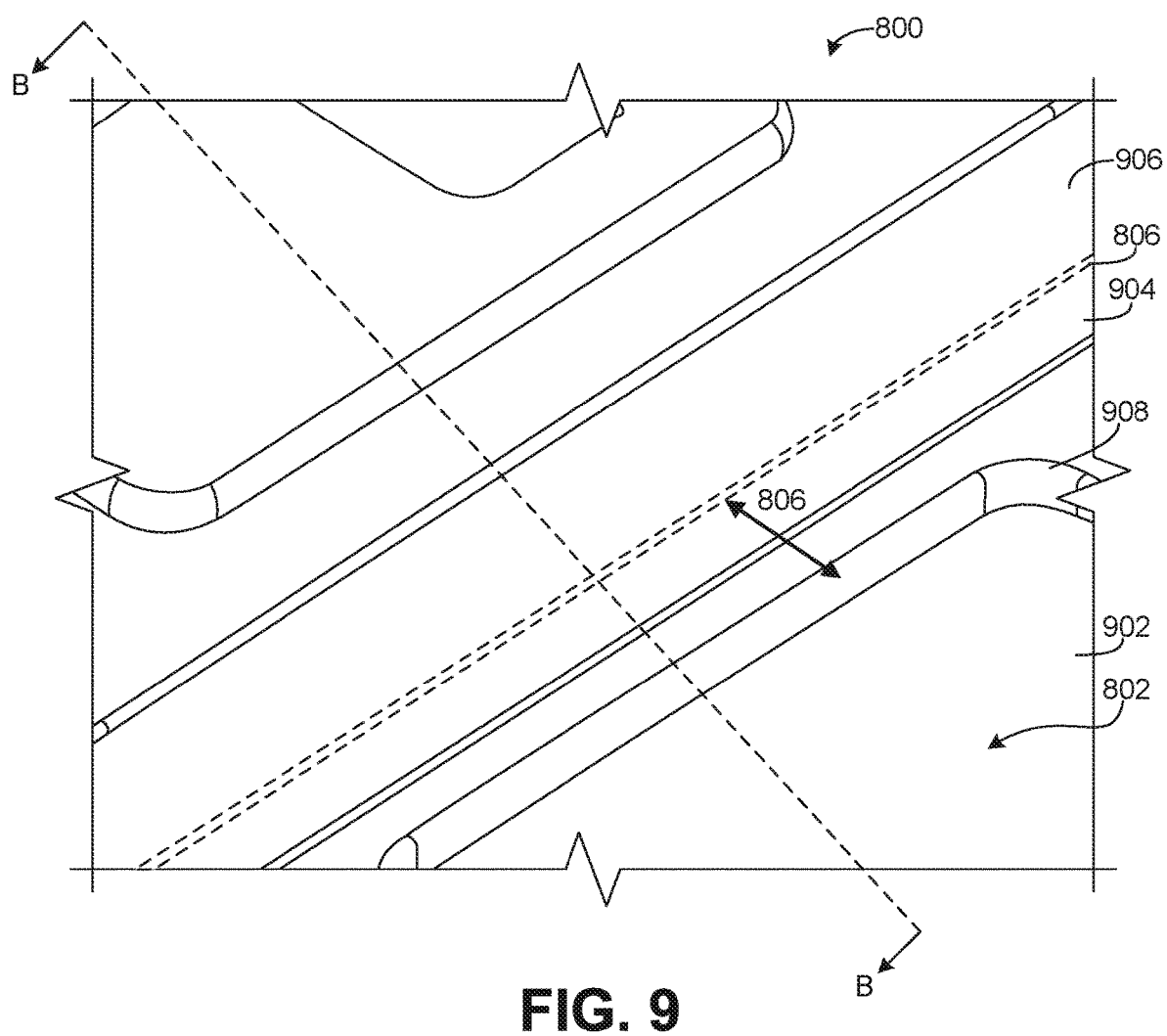
FIG. 9 is an enlarged, perspective view of a portion of an example fluid ejection die having the conductive wire of FIG. 8 adjacent a location at which a fluid feed slot is to be formed in accordance with the teachings herein.

FIG. 9 is an enlarged, perspective view of the example fluid ejection die 800 that includes the example conductive wire 806 adjacent a location at which one of the example fluid feed slots 802 is to be formed in accordance with the teachings herein. As illustrated in FIG. 9, the fluid ejection die 800 includes a silicon layer or wafer 902, a first layer 904, and a second layer 906. The fluid feed slot 802 is to be fabricated in the silicon wafer 902 via, for example, a laser manufacturing process and a subsequent wet-etching process.

In the illustrated example, the fluid feed slot 802 to be formed in the silicon wafer 902 is defined by an edge 908 of the first layer 904 of the fluid ejection die 800. Further, as illustrated in FIG. 9, the conductive wire 806 is disposed in the first layer 904 and is spaced apart from the edge 908 by the distance 806 to enable the electrical resistance of the conductive wire 806 to correspond to whether a defect is formed along the edge 908. In the illustrated example, the distance 814 between the conductive wire 806 and the edge 908 is approximately 7 micrometers so that the conductive wire 806 is affected (e.g., the conductive wire 806 is physically damaged, an open circuit is formed along the conductive wire 806 and/or an electrical resistance of the conductive wire 806 increases) when the edge 908 of the fluid feed slot 802 is damaged. In the illustrated example, the second layer 906 is a protective layer composed of, for example, tantalum to protect the first layer 904, the silicon wafer 902, the conductive wire 806 and/or any other layers of the fluid ejection die 800.

Figure 10:
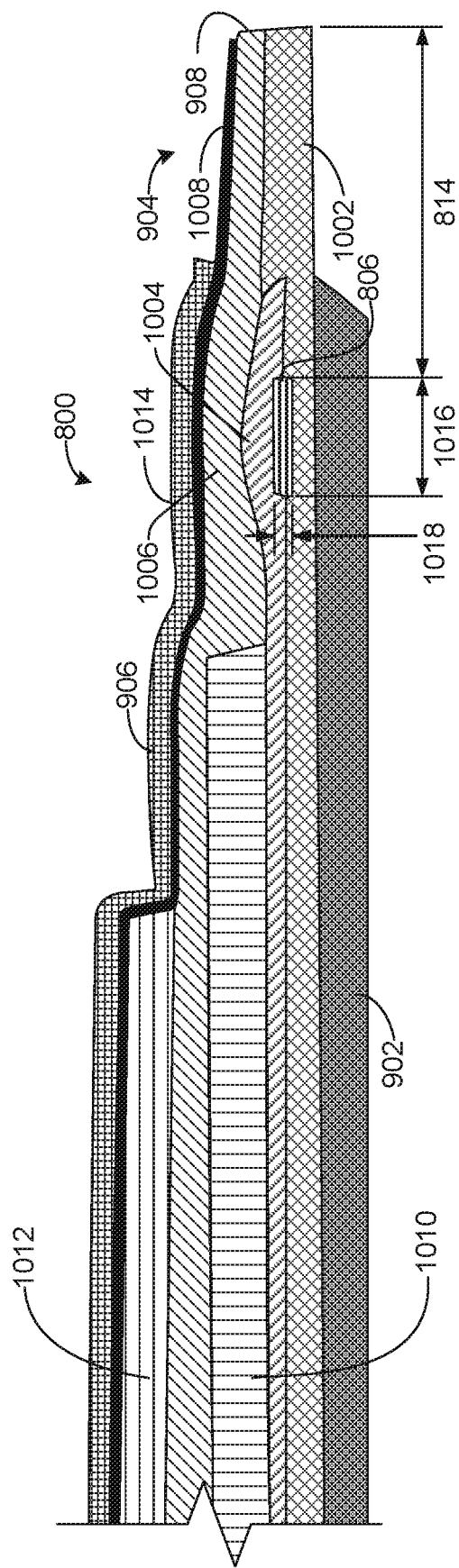
FIG. 10 is an enlarged, cross-sectional view taken along line B-B of the portion of the fluid ejection die of FIG. 9.

FIG. 10 is an enlarged, cross-sectional view taken along line B-B of FIG. 9 of a portion of the fluid ejection die 800 in which the fluid feed slot 802 (FIG. 8) is formed in the silicon wafer 902 in accordance with the teachings herein. As illustrated in FIG. 10, the first layer 904 of the fluid ejection die 800 is between the second layer 906 and the silicon wafer 902. The example first layer 904 includes, for example, a field oxide layer 1002, a first dielectric layer 1004, a second dielectric layer 1006, and a passivation layer 1008. Further, the conductive wire 806, a first metallic layer 1010, and a second metallic layer 1012 are disposed between the second layer 906 and the silicon wafer 902. In the illustrated example, an end 1014 of the second layer 906 extends beyond the conductive wire 806 to protect the conductive wire 806. In other examples, the conductive wire 806 may align with or extend beyond the end 1014 of the second layer 906.

The example first metallic layer 1010 and the example second metallic layer 1012 provide power and/or route electrical signals to enable (e.g., initiate, control a rate of) printing material to flow through the fluid feed slot 802 of the fluid ejection die 800. The example field oxide layer 1002 isolates the silicon wafer 902 from other components of the fluid ejection die 800. The example first dielectric layer 1004 provides insulation between the conductive wire 806 and the first metallic layer 1010 and/or between the first metallic layer 1010 and the silicon layer 902. The example second dielectric layer 1006 provides insulation between the first metallic layer 1010 and the second metallic layer 1012. Further, the example passivation layer 1008 of the first layer 904 provides electrical and/or chemical insulation to the second metallic layer 1012 and/or other adjacent layers of the fluid ejection die 800.

The example conductive wire 806 has a width 1016 and a thickness 1018. In the illustrated example, the width 1016 is approximately 2 micrometers and the thickness is less than 1 micrometer. The conductive wire 806 is spaced apart from the edge 908 defining the fluid feed slot 802 by the distance 814 (e.g., approximately 7 micrometers). Further, the example conductive wire 806 is composed of polysilicon, aluminum copper and/or any other conductive material that is reactive with and/or susceptible to liquid solvent (e.g., TMAH) of the wet-etching process of the fabrication process of the fluid feed slot 802. As a result, if the laser machining process of the fabrication process of the fluid feed slot 802 damages the edge 908 and enables the liquid solvent to reach the conductive wire 806, the liquid solvent damages the structure of the conductive wire 806 and/or otherwise affects the electrical resistance of the conductive wire 806 (e.g., creates an open circuit). When a predetermined voltage is applied to the electrical resistance, the increased electrical resistance of the conductive wire 806 is detected and, thus, the defect along the edge 908 is identified. Additionally or alternatively, the laser machining process during the fabrication of the fluid ejection die 800 may directly damage the conductive wire, thereby increasing the electrical resistance of the conductive wire 806 that will be detected when a predetermined voltage is applied to the conductive wire 806. In the illustrated example, the conductive wire 806 is positioned between the edge 908 defining the fluid feed slot 802 and the first and second metallic layers 1010, 1012 to enable the electrical resistance of the conductive wire 806 to correspond to whether damage is caused to the first metallic layer 1010 and/or the second metallic layer 1012.

Figure 11:
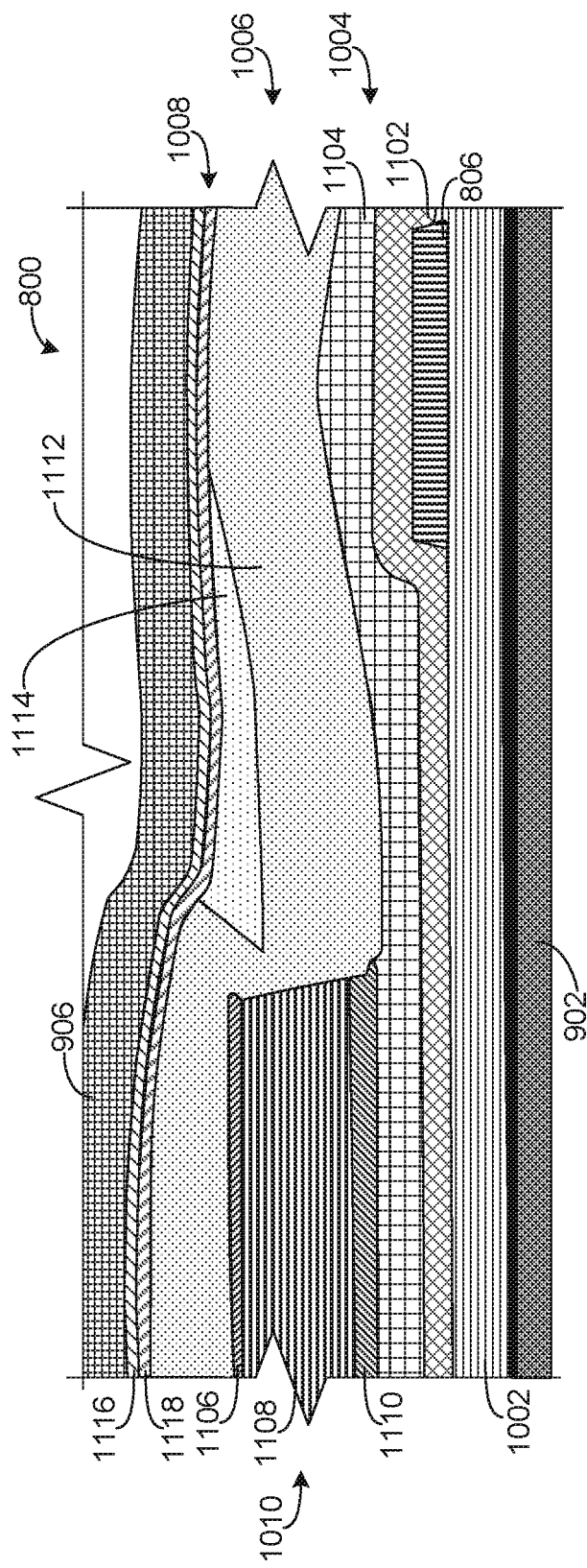
FIG. 11 is a further enlarged, cross-sectional view of a portion of the fluid ejection die of FIGS. 9-10.

FIG. 11 is a further enlarged, cross-sectional view of a portion of the fluid ejection die 800. As illustrated in FIG. 11, the field oxide layer 1002 extends along the silicon wafer 902 to isolate the silicon wafer 902 from other components (e.g., the conductive wire 806, the first metallic layer 1010, etc.) of the fluid ejection die 800. The example first dielectric layer 1004 includes a tetraethyl orthosilicate (TEOS) layer 1102 and a borophosphosilicate glass (BPSG) layer 1104. As illustrated in FIG. 11, the TEOS layer 1102 engages the conductive wire 806 and the BPSG layer 1104 engages the first metallic layer 1010. The example first metallic layer 1010 includes a titanium nitride layer 1106, an aluminum copper layer 1108, and a titanium or titanium nitride layer 1110. Further, the example second dielectric layer 1006 that provides insulation between the first metallic layer 1010 and the second metallic layer 1012 includes a high-density plasma tetraethyl orthosilicate layer (HDP-TEOS) 1112 and a tetraethyl orthosilicate layer (TEOS) 1114. As illustrated in FIG. 11, the passivation layer 1008 that engages the second layer 906 of the fluid ejection die 800 includes a silicon carbide layer 1116 and a silicon nitride layer 1118.

Figure 12:
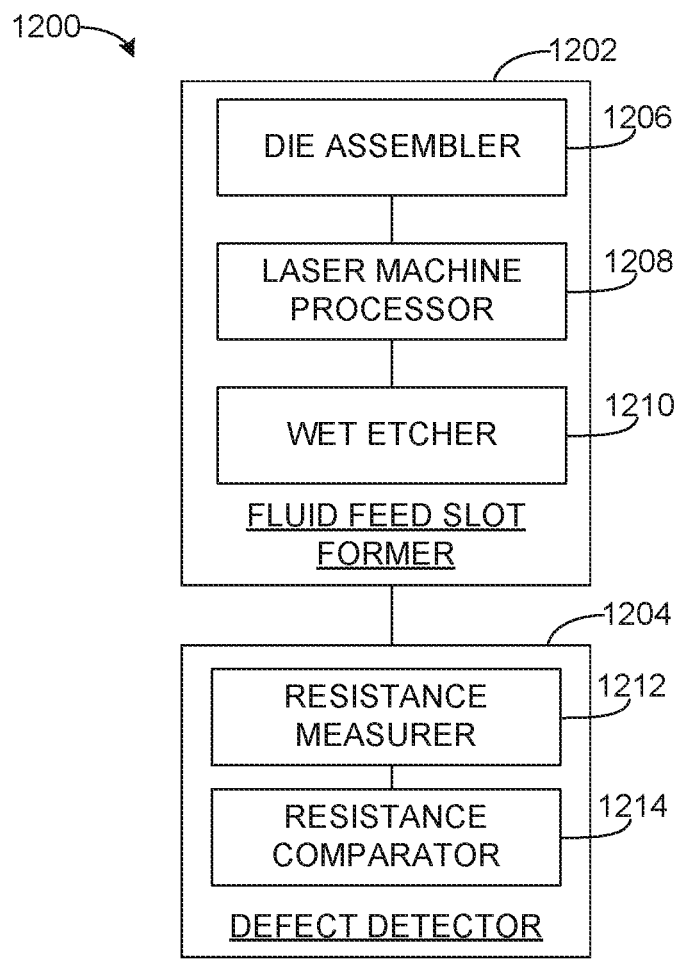
FIG. 12 is block diagram of an example die manufacturer in accordance with the teachings disclosed herein to detect a defect of a fluid feed slot via the example conductive wire of FIGS. 8-11.

FIG. 12 is block diagram of an example die manufacturer 1200 in accordance with the teachings disclosed herein that assembles the fluid ejection die 800 (FIGS. 9-11) and detects, via the conductive wire 806 (FIGS. 8-11), whether the fluid feed slot 802 (FIGS. 8-9) is defective. As illustrated in FIG. 12, the die manufacturer 1200 includes an example fluid feed slot former 1202 and an example defect detector 1204.

As illustrated in FIG. 12, the example fluid feed slot former 1202 includes an example die assembler 1206, an example laser machine processor 1208, and an example wet etcher 1210. The example die assembler 1206 produces and/or assembles layers of material to form the example fluid ejection die 800. For example, to form the fluid ejection die 800, the die assembler 1206 assembles the silicon wafer 902, the conductive wire 806 and/or the conductive wire 808, the first layer 904 (FIGS. 9-10), and the second layer 906 (FIGS. 9-11). For example, the die assembler 1206 positions the conductive wire 806 on the fluid ejection die 800 adjacent the intended location of the perimeter 810 (FIG. 8) of the fluid feed slots 802. Additionally or alternatively, the die assembler 1206 positions the conductive wire 808 on the fluid ejection die 800 adjacent the intended location of the perimeter 812 (FIG. 8) of the fluid feed slots 804. In some examples, to form the first layer 904, the die assembler 1206 assembles the field oxide layer 1002 (FIGS. 10-11), the first dielectric layer 1004 (FIGS. 10-11), the second dielectric layer 1006 (FIGS. 10-11), the passivation layer 1008 (FIGS. 10-11), the first metallic layer 1010 (FIGS. 10-11), and the second metallic layer 1012 (FIG. 10).

The example laser machine processor 1208 performs a laser machining process to form trenches (e.g., the trench 304 of FIGS. 3-4) in the silicon wafer 902. For example, the laser machine processor 1208 directs a laser toward a location on the silicon wafer 902 at which the fluid feed slots 802, 804 are to be formed to remove portions of the silicon wafer 902 via thermal energy to form the trenches. The example wet etcher 1210 performs a wet-etching process to refine the trenches to form the fluid feed slots 802, 804 in the silicon wafer 902. For example, to form the fluid feed slots 802, 804, the wet etcher 1210 applies a liquid solvent (e.g., tetramethylammonium (TMAH)) to the silicon wafer 902 to dissolve silicon of the silicon wafer adjacent the trenches.

The example defect detector 1204 includes an example resistance measurer 1212 (e.g., an ohmmeter) and an example resistance comparator 1214. For example, the resistance measurer 1212 includes an electrical circuit that is electrically and/or communicatively coupled to the conductive wire 806 and/or the conductive wire 808. The resistance measurer 1212, via the electrical circuit, applies a predetermined voltage to the conductive wire 806 and/or the conductive wire 808. For example, the resistance measurer 1212 measures a corresponding electrical resistance of the conductive wire 806 to determine if the conductive wire 806 and, thus, one of the fluid feed slots 802 adjacent the conductive wire 806 has been damaged and/or is otherwise defective. Additionally or alternatively, the resistance measurer 1212 measures a corresponding electrical resistance of the conductive wire 808 to determine if the conductive wire 808 and, thus, one of the fluid feed slots 804 adjacent the conductive wire 808 has been damaged and/or is otherwise defective. For example, the resistance measurer 1212 applies the predetermined voltage and measures a first resistance of the conductive wire 806 and/or the conductive wire 808 before the corresponding fluid feed slots 802 and/or fluid feed slots 804 are formed in the fluid ejection die 800. Subsequently, the resistance measurer 1212 applies the predetermined voltage and measures a second resistance of the conductive wire 806 and/or the conductive wire 808 after the trenches and/or the corresponding fluid feed slots 802, 804 are formed. Further, the example resistance comparator 1214 compares the first resistance and the second resistance measured by the resistance measurer 1212 to determine whether any of the fluid feed slots 802 and/or the fluid feed slots 804 is defective. For example, if the second resistance is greater than the first resistance, the example defect detector 1204 determines that at least one of the fluid feed slots 802, 804 is defective. Otherwise, the defect detector 1204 determines that the fluid feed slot is not defective.

While an example manner of implementing the die manufacturer 1200 is illustrated in FIG. 12, one or more of the elements, processes and/or devices illustrated in FIG. 12 may be combined, divided, re-arranged, omitted, eliminated and/or implemented in any other way. Further, the example fluid feed slot former 1202, the example defect detector 1204, the example die assembler 1206, the example laser machine processor 1208, the example wet etcher 1210, the example resistance measurer 1212, the example resistance comparator 1214 and/or, more generally, the example die manufacturer 1200 of FIG. 12 may be implemented by hardware, software, firmware and/or any combination of hardware, software and/or firmware. Thus, for example, any of the example fluid feed slot former 1202, the example defect detector 1204, the example die assembler 1206, the example laser machine processor 1208, the example wet etcher 1210, the example resistance measurer 1212, the example resistance comparator 1214 and/or, more generally, the example die manufacturer 1200 of FIG. 12 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example fluid feed slot former 1202, the example defect detector 1204, the example die assembler 1206, the example laser machine processor 1208, the example wet etcher 1210, the example resistance measurer 1212, the example resistance comparator 1214 and/or, more generally, the example die manufacturer 1200 of FIG. 12 is/are hereby expressly defined to include a tangible computer readable storage device or storage disk such as a memory, a digital versatile disk (DVD), a compact disk (CD), a Blu-ray disk, etc. storing the software and/or firmware. Further still, the example die manufacturer 1200 of FIG. 12 may include one or more elements, processes and/or devices in addition to, or instead of, those illustrated in FIG. 12, and/or may include more than one of any or all of the illustrated elements, processes and devices.

Figure 13:
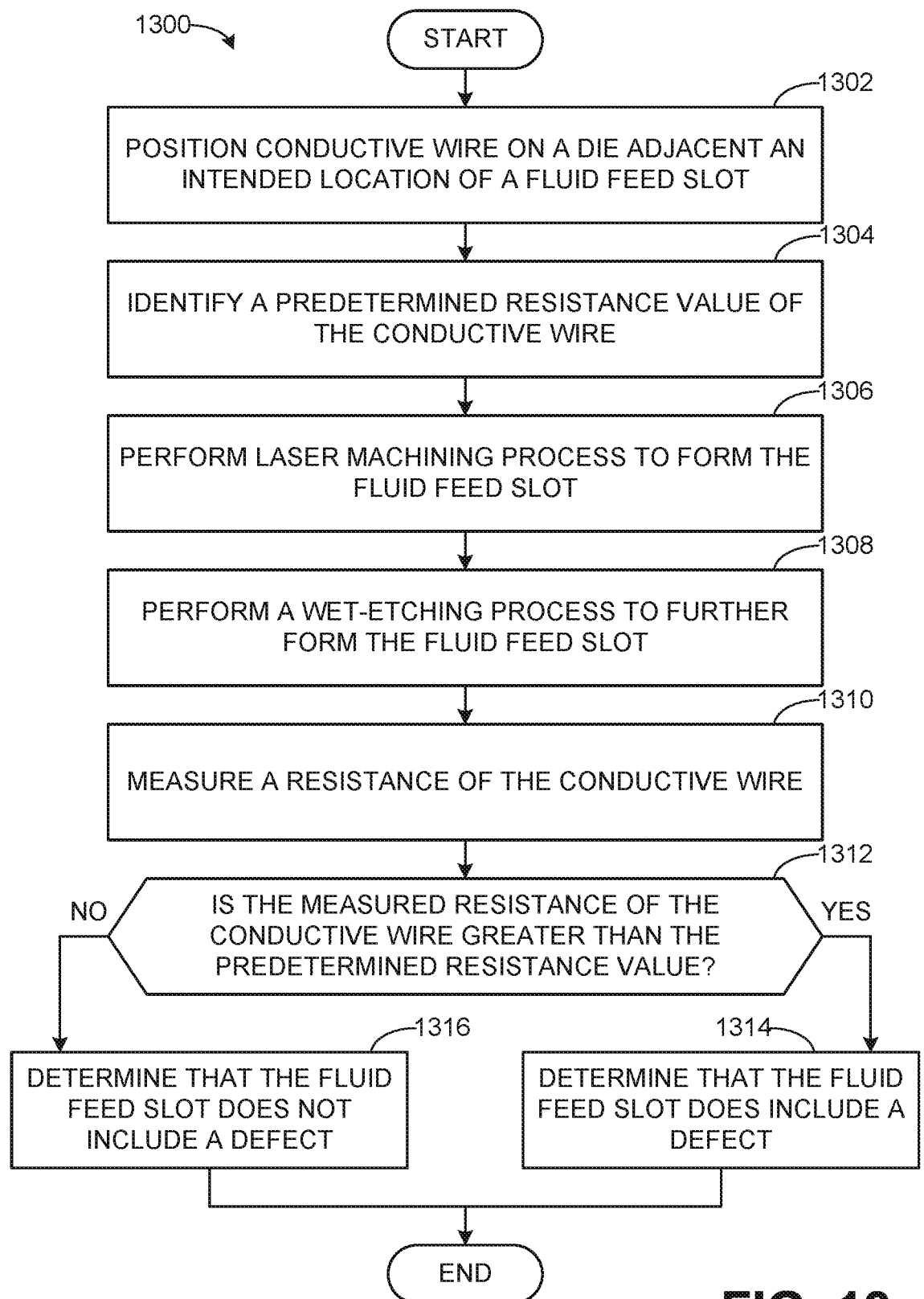
FIG. 13 is a flow diagram representative of example machine readable instructions that may be executed to implement the die manufacturer of FIG. 12 to detect a defect of a fluid feed slot via the example conductive wire of FIGS. 8-11.

A flowchart representative of example machine readable instructions for implementing the die manufacturer 1200 of FIG. 12 is shown in FIG. 13. In this example, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 13, many other methods of implementing the example die manufacturer 1200 may alternatively be used. For example, the order of execution of the blocks may be changed, and/or some of the blocks described may be changed, eliminated, or combined.

As mentioned above, the example processes of FIG. 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 13 is a flow diagram 1300 representative of example machine readable instructions that may be executed to implement the die manufacturer 1200 of FIG. 12 to assemble a die (e.g., the fluid ejection die 800 of FIGS. 8-11) and detect a defect of a fluid feed slot (e.g., 802 of FIGS. 8-9) via a conductive wire (e.g., the conductive wire 806 and/or the conductive wire 808 of FIGS. 8-11). Initially, at block 1302, the example die assembler 1206 of the example fluid feed slot former 1202 positions the conductive wire on the die adjacent an intended location of a perimeter (e.g., the perimeter 810 and/or the perimeter 812 of FIG. 8) of the fluid feed slot to be formed. For example, the die assembler 1206 positions the conductive wire between a field oxide layer (e.g., the field oxide layer 1002 of FIGS. 10-11) and a dielectric layer (e.g., the first dielectric layer 1004 of FIGS. 10-11) of the die.

At block 1304, the example defect detector 1204 identifies a predetermined resistance value of the conductive wire. For example, the resistance measurer 1212 of the defect detector 1204 applies a predetermined voltage and measures a corresponding first resistance of the conductive wire before the fluid feed slot is formed in the die to identify the predetermined resistance value.

At block 1306, the example laser machine processor 1208 of the example fluid feed slot former 1202 performs a laser machining process to form the fluid feed slot. For example, the laser machine processor 1208 performs the laser machining process to form a trench (e.g., the trench 304 of FIGS. 3-4) to enable the fluid feed slot to be formed. At block 1308, the example wet etcher 1210 of the example fluid feed slot former 1202 performs a wet-etching process to further form the fluid feed slot. For example, the wet etcher 1210 performs the wet-etching process to refine the trench formed by the laser machine processor 1208 into the fluid feed slot.

At block 1310, the example resistance measurer 1212 of the example defect detector 1204 measures a resistance of the conductive wire. For example, the resistance measurer 1212 applies the predetermined voltage and measures a corresponding second resistance of the conductive wire. In some examples, the resistance measurer 1212 measures the resistance of the conductive wire after the fluid feed slot is formed. Additionally or alternatively, the resistance measurer 1212 measures the resistance between the laser machining processor 1208 performing the laser machining process and the wet etcher 1210 performing the wet-etching process.

At block 1312, the example resistance comparator 1214 of the example defect detector 1204 determines whether the resistance measured at block 1310 is greater than the predetermined resistance value identified at block 1304. For example, the resistance comparator 1214 compares the first resistance of the conductive wire that is measured before the fluid feed slot is formed and the second resistance of the conductive wire that is measure while and/or after the fluid feed slot is formed. If the resistance comparator 1214 determines that the measured resistance is greater than the predetermined resistance value, the defect determiner 1204 determines that the fluid feed slot does not includes a defect (block 1314). If the resistance comparator 1214 determines that the measured resistance is not greater than (i.e., is less than or equal to) the predetermined resistance value, the defect determiner 1204 determines that the fluid feed slot does include a defect (block 1316).

Figure 14:
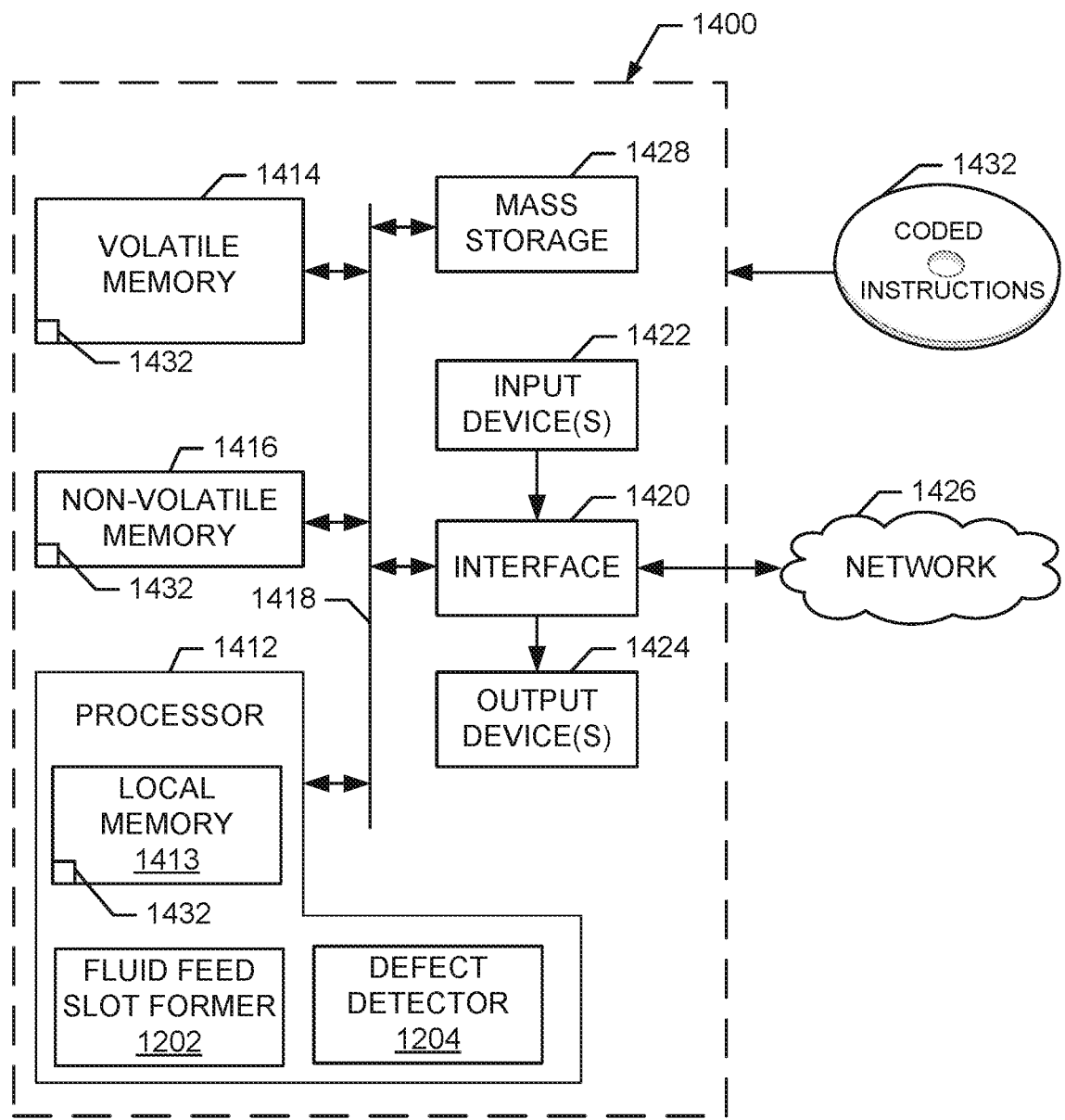
FIG. 14 is a block diagram of an example processor system structured to execute the example machine readable instructions represented by FIG. 13 to implement the example die manufacturer of FIG. 12.

FIG. 14 is a block diagram of an example processor platform 1400 capable of executing the instructions of FIG. 13 to implement the die manufacturer 1200 of FIG. 12. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The processor 1412 of the illustrated example includes the example fluid feed slot former 1202, the example defect detector 1204, the example die assembler 1206, the example laser machine processor 1208, the example wet etcher 1210, the example resistance measurer 1212, the example resistance comparator 1214 and/or, more generally, the example die manufacturer 1200.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

Coded instructions 1432 of FIG. 13 may be stored in the mass storage device 1428, in the volatile memory 1414, in the non-volatile memory 1416, and/or on a removable tangible computer readable storage medium such as a CD or DVD.

From the foregoing, it will appreciated that the above disclosed methods and apparatus enable fluid feed slots formed in a fluid ejection die to be tested for defects before a fluid ejection device is fully or near fully assembled, thereby reducing costly waste resulting from defective fluid ejection dies. More specifically, the above disclosed methods and apparatus include a conductive wire disposed between layers coupled to a silicon wafer and positioned adjacent the fluid feed slots that facilitates and/or enables detection of a defect formed in those layers along the edges of the fluid feed slots during and/or immediately after a fabrication process of the fluid ejection die.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a die including a silicon layer and a first layer coupled to the silicon layer; and
 a conductive wire disposed in the first layer and surrounding a fluid feed opening region in correspondence with a perimeter of the fluid feed opening region, a fluid feed opening to be formed in the silicon layer at the fluid feed opening region, the conductive wire having an electrical characteristic that corresponds to whether the fluid feed opening is defective after formation thereof.

2. The apparatus of claim 1, wherein the conductive wire is positioned in the first layer to enable an electrical resistance of the conductive wire to increase when an edge of the first layer adjacent the fluid feed opening is defective.

3. The apparatus of claim 1, wherein the electrical characteristic of the conductive wire is an electrical resistance, the electrical resistance indicates that the die is defective when the electrical resistance is greater than a predetermined value.

4. The apparatus of claim 1, wherein the first layer includes a field oxide layer, a dielectric layer, and a metallic layer, the field oxide layer to isolate the silicon layer from the metallic layer and the conductive wire, the dielectric layer to provide insulation between the metallic layer and the conductive wire.

5. The apparatus of claim 4, wherein the conductive wire is positioned between the perimeter of the fluid feed opening region and the metallic layer such that the electrical characteristic of the conductive wire is to correspond to whether the metallic layer is damaged.

6. The apparatus of claim 1, wherein the conductive wire is spaced apart from the perimeter of the fluid feed opening region by approximately between 4 micrometers and 8 micrometers such that detection of whether the fluid feed opening is defective after formation thereof is detected with the conductive wire.

7. The apparatus of claim 1, wherein the electrical characteristic of the conductive wire corresponds to a defect formed by at least one of a laser machining process and a wet-etching process during fabrication of the fluid feed opening.

8. The apparatus of claim 1, wherein the conductive wire further surrounding a plurality of other fluid feed opening regions in correspondence with perimeters of the other fluid feed opening regions, other fluid feed openings to be formed in the silicon layer at the other fluid feed opening regions, the electrical characteristic of the conductive wire corresponds to whether any of a group of fluid feed openings including the fluid feed opening of the fluid feed opening region and the other fluid feed openings of the other fluid feed opening regions is defective.

9. The apparatus of claim 1, wherein the conductive wire has a plurality of adjacent contiguous portions, the fluid feed opening region has a plurality of sides, and each adjacent contiguous portion of the conductive wire is parallel to a different side of the fluid feed opening region.

10. The apparatus of claim 9, wherein each adjacent contiguous portion of the conductive wire is separated from the different side of the fluid feed opening region to which the adjacent contiguous portion is parallel by a distance.

11. The apparatus of claim 10, wherein the distance is approximately between 4 micrometers and 8 micrometers.

12. A method comprising:
positioning a conductive wire in a first layer of a die to surround a fluid feed opening region in correspondence with a perimeter of the fluid feed opening region; and
forming a fluid feed opening in a silicon layer at the fluid feed opening region, the first layer coupled to the silicon layer, the conductive wire positioned such that an electrical characteristic of the conductive wire corresponds to whether the formed fluid feed opening layer is defective.

13. The method of claim 12, further comprising determining whether the fluid feed opening is defective by comparing the electrical characteristic of the conductive wire to a predetermined resistance value, the electrical characteristic being an electrical resistance, the electrical resistance indicating that the fluid feed opening is defective if the electrical resistance is greater than the predetermined resistance value.

14. The method of claim 13, further including measuring the electrical resistance of the conductive wire after the fluid feed opening is fabricated, the electrical resistance to correspond to whether at least one of a laser manufacturing process and a wet-etching process damaged an edge of the first layer adjacent the fluid feed opening during fabrication of the fluid feed opening.

15. The method of claim 13, further including measuring the electrical resistance of the conductive wire after a laser machining process and before a wet-etching process during fabrication of the fluid feed opening, the electrical resistance to correspond to whether the laser manufacturing process damaged an edge of the first layer adjacent the fluid feed opening during fabrication of the fluid feed opening.

16. An apparatus comprising:
a fluid ejection die including a silicon wafer and a first layer; and
a conductive wire disposed in the first layer adjacent a perimeter of a location at which a fluid feed opening is to be formed in the silicon wafer, the conductive wire having an electrical resistance that corresponds to whether a defect is formed during fabrication of the fluid feed opening.

17. The apparatus of claim 16, wherein the conductive wire is composed of material that is reactive to a liquid solvent of a wet-etching process.

18. The apparatus of claim 17, wherein the conductive wire is composed of polysilicon or aluminum copper.

* * * * *